United States Patent
Kanteti et al.

(10) Patent No.: US 9,229,864 B1
(45) Date of Patent: Jan. 5, 2016

(54) MANAGING METADATA SYNCHRONIZATION FOR REDUCING HOST SYSTEM LATENCY IN A STORAGE SYSTEM

(71) Applicant: EMC Corporation, Hopkinton, MA (US)

(72) Inventors: Kumar Kanteti, South Grafton, MA (US); William Davenport, Burlington, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 13/834,385

(22) Filed: Mar. 15, 2013

(51) Int. Cl.
  *G06F 12/08* (2006.01)
(52) U.S. Cl.
  CPC ........ *G06F 12/0808* (2013.01); *G06F 12/0868* (2013.01)
(58) Field of Classification Search
  None
  See application file for complete search history.

(56) References Cited

U.S. PATENT DOCUMENTS

| | | | |
|---|---|---|---|
| 5,819,292 A * | 10/1998 | Hitz et al. | |
| 5,895,488 A * | 4/1999 | Loechel | 711/135 |
| 6,678,794 B1 * | 1/2004 | Talyansky et al. | 711/135 |
| 6,732,124 B1 * | 5/2004 | Koseki et al. | |
| 7,689,599 B1 | 3/2010 | Shah et al. | |
| 8,312,217 B2 | 11/2012 | Chang et al. | |
| 8,392,312 B2 | 3/2013 | Batsakis et al. | |

* cited by examiner

*Primary Examiner* — Charles Rones
*Assistant Examiner* — Hewy Li
(74) *Attorney, Agent, or Firm* — BainwoodHuang

(57) ABSTRACT

Flushing cache memory of dirty metadata in a plurality of file systems without either letting the caches reach their maximum capacity, or using so much of the total system IO process bandwidth that host system IO process requests are unreasonably delayed, may include determining the length of an interval between sync operations for each individual one of the plurality of file system, and how to divide a system wide maximum sync process IO operation bandwidth fairly between various ones of the plurality of file systems. A computer dynamically measures overall system operation rates, and calculates an available portion of a current calculated sync operation bandwidth for each file system. The computer also measures file system operation rates and determines how long a time period should be between sync operations in each file system.

30 Claims, 6 Drawing Sheets

MANAGING METADATA SYNCHRONIZATION FOR REDUCING HOST SYSTEM LATENCY IN A STORAGE SYSTEM

BACKGROUND

Host systems writing data to a persistent memory device or storage system, typically a persistent memory or non-volatile data memory media such as a magnetic hard disk drive (HDD), an electronic flash drive (EFD), or a solid state disk (SSD), may use what is known as a storage processor (SP) system to control how the input and output operations (IO) from the host system are transmitted to the storage system. The storage processors (SP) may have many parallel file systems operating in one, or in a plurality of SP systems, that perform the data mapping and data format translations needed for transmitting IO operations from the host system to the storage system. The SP file system operations may generate and also keep track of various pieces of information about the IO data that the SP file system is sending to the storage media. This data about the data being handled in the SP file system may be known as metadata. Metadata may be information about inode tables, block metadata (BMD), slice mapping, special block data, file type, and other forms of information about the data, and may be temporarily stored in a cache memory in the SP file system.

The SP file system may temporarily locally store the generated metadata to a cache buffer memory location in the SP file system, and the SP file system may mark the buffer as being dirty, since the metadata in the SP file system buffer is now not the same as in the storage system due to the handling by the SP file system, i.e., the data is not synchronized. The SP file system may perform what may be known as a sync operation, for example every 10 to 40 seconds to sync the metadata. These sync operations require that a selected portion of the total IO process bandwidth be dedicated to the IO needed for the sync operation, and thus may reduce the total number of IO processes available for host read and write (R/W) requests. This may increase the host latency time for IO operations in high usage situations.

The sync operation for the flushing of dirty metadata from a cache memory to the persistent memory needs to occur often enough for the cache to remain available, and yet not use so many IO operations that the host IO operations are delayed.

SUMMARY

A potential problem with keeping data consistent between various locations where it may be stored is that after operating on a piece of data it is necessary to update the value of the data in the original location to reflect the data operation. Every computing system or storage processor has a maximum number of possible concurrent IO operations that can be performed, and if every IO operation immediately required writing the changed value back to the main memory, known as synchronizing the data, then during periods of high host system IO operation requests, there may be data congestion, and increased host system request delay times. To improve system reaction time, data that has been manipulated may be temporarily stored in a cache memory. When the number of IO operations requested is reduced the cache memories can be flushed to the main memory in a sync operation without creating data congestion. Even if the number of IO operations is not reduced, there is a limit to how much dirty metadata the SP file system cache can hold, and before the SP file system cache is full a sync operation to flush the cache must occur for the computer system to continue to operate.

Determining when to flush a SP cache memory of dirty metadata needs to be determined in an efficient fashion for proper system utilization. The cache memory may be one of many caches in a plurality of SP file systems in a storage processor system, and the flushing should occur without either letting the caches reach their maximum capacity, or using so much of the total system IO process bandwidth that host system IO process requests are unreasonably delayed. The flushing process may include determining the length of an interval between sync operations for each individual one of the plurality of SP file system, and how to divide a system wide maximum sync process IO operation bandwidth fairly between various ones of the plurality of SP file systems. A computer such as a storage processor, can dynamically measure overall system operation rates, and calculate an available portion of a current calculated sync operation bandwidth for each file system to use. The computer may also measure SP file system operation rates and determine how long a time period should be between successive sync operations in each SP file system.

A method is disclosed for flushing dirty metadata memory buffers in a SP file system by periodically performing a sync process transferring dirty metadata buffers in a SP file system cache memory to a persistent memory, a process known as flushing. The method includes identifying dirty metadata memory buffers in the cache, and calculating the number of concurrent IO operations needed for flushing dirty metadata memory buffers in the cache memory to the persistent memory, which may also be known as a SP main memory, non-volatile memory, or a database, and may include such non-volatile devices as a magnetic hard disk drive (HDD), an electronic flash drive (EFD), or a solid state disk (SSD).

The number of concurrent IO operations needed may be obtained by dividing the current number of dirty metadata memory buffers in the SP file system by a flush rate, and then dividing the result by the time to reach a predetermined high water mark of a number of dirty metadata memory buffers in the SP file system. The time to reach the high water mark may be called $T_{hw}$. Once the needed number of IO operations is determined the method can either initiate a new IO operation to transfer a dirty metadata to the persistent memory location if the number of sync IO operations is less than the needed number, or refraining from initiating the new IO operation if the number is greater than the needed number of concurrent IO operations.

The number of dirty metadata memory buffers in the cache memory of the SP file system may be directly measured, and the flush rate of dirty metadata memory buffers in the SP file system may be determined by dividing the current active log size by the current system log size, and multiplying the result by a global storage system flush rate.

The value $T_{hw}$ can be calculated by determining the current number of log holds used in the SP file system, and then determining the current log hold accumulation rate in the file system, which is related to the total numbers of host system IO operations and system history. The maximum allowable number of dirty metadata buffers in a cache memory in the SP file system is called the high water mark, and subtracting the number of log holds used from the high water mark, and dividing by the current log hold accumulation rate can provide the value $T_{hw}$. In the case where the SP file system is just one of many file systems in a storage system, then the value of $T_{hw}$ can be found by calculating the time to reach the high water mark in each one of the file systems, and then setting the value of $T_{hw}$ for the storage system to be the minimum time value of all of the individual file system times.

There may be more than a single cache memory in each file system, each cache storing different types of metadata for different types of storage. In such a case determining the minimum time to reach the high water mark, which may be called $T_{min}$ may include determining a time until each of the caches must be flushed. Each different cache type can have the time until the high water mark is reached in that cache by using variations of these basic calculations. For example, calculating a block metadata (BMD) time, $T_{BMD}$, may be done by subtracting a measured number of log holds used from a predetermined BMD high water mark, and dividing the result by a measured accumulation rate for BDM in that cache. Calculating a log size time, $T_{log-size}$, may be done by subtracting a measured active log size from a predetermined log size high water mark, and dividing the result by a measured accumulation rate of active log entries.

Similarly, calculating a log hold time, $T_{log-hold}$, may be done by subtracting a measured number of log holds used from a predetermined log hold high water mark, and dividing by a measured log hold accumulation rate, and calculating an inode buffer time, $Ti_b$, may be done by subtracting a measured number of inode buffers used from a predetermined inode high water mark, and dividing by a measured inode buffer accumulation rate, and so on. Using the minimum value of the calculated values $T_{BDM}$, $T_{log-size}$, $T_{log-hold}$, and $Ti_b$, gives the value of $T_{min}$ for the file system.

Determining whether there is an unused IO channel that can be used for flushing dirty metadata memory buffers in the cache memory may include calculating at least one of a file system IO latency time, a size of an active file system log size, an amount of cache memory assigned to log hold events, and a total amount of cache memory currently used for different buffers types in the file system.

A system to flush dirty metadata memory buffers in a storage system may include controller circuitry such as communication circuitry enabling electrical signals to flow between at least one host system and at least one file system of the storage system via the controller circuitry. The controller circuitry may be arranged to perform a sync process periodically to transfer dirty metadata memory buffers in a cache memory of the file system to a persistent memory using IO channel operations. The controller can identify dirty metadata memory buffers in the cache memory, and calculate a required number of concurrent IO operations needed to flush dirty metadata memory buffers in a cache memory to a persistent memory.

The number of concurrent IO operations can be calculated by dividing a current number of dirty metadata memory buffers in the file system by a flush rate, and then dividing by $T_{hw}$, a time to reach a predetermined high water mark of a number of dirty metadata memory buffers in the file system. The system can initiate a new IO operation to transfer a dirty metadata buffer to the persistent memory location if the number of current IO operations being used for flushing dirty metadata memory buffers is less than the required number of concurrent IO operations.

If the number of current IO operations being used for flushing dirty metadata memory buffers is greater than the required number of concurrent IO operations, then the controller can refrain from initiating a new IO operation to delay transfer of the dirty metadata to the persistent memory location until there are available IO operations.

The time $T_{hw}$ may be determined by subtracting the number of log holds used from the high water mark, and then dividing by the current log hold accumulation rate to obtain the value $T_{hw}$. If the SP file system is one of a plurality of files systems in a storage system, then $T_{hw}$ can be determined by calculating a value of a time $T_{min}$ to reach a predetermined high water mark in each individual one of the SP file systems, and then set the value of $T_{hw}$ for the storage system to be the minimum value of all of the individual file system minimum times. This may be done by determining a time until each of a number of caches in each file system must be flushed and using the shortest (i.e., the minimum) time. Examples of the different types of caches that may be found in file systems include caches for block metadata (BMD) time, $T_{BMD}$, active log size, $T_{log-size}$, log hold time, $T_{log-hold}$, and inode buffer time, $Ti_b$.

In addition to improving dirty metadata flushing from cache memory to a main memory or database by calculating the proper number of IO processes to use concurrently during a given sync operation (i.e., flushing), the system may also calculate a proper sync interval time between the end of a sync process and a start of a new sync process. In this fashion there may be periods of time during which 100% of the total system IO process bandwidth, typically known as the backend bandwidth, is being used for host system IO processes, resulting in improved host IO latency times for the memory system. The sync interval may be calculated for each individual file system, since each file system has different usage rates at different times and thus different rates at which the cache buffers are filled with dirty metadata. The sync interval should also be adjusted based upon the storage processor overall system status in addition to the status for an individual file system.

The sync interval may be calculated by dividing system wide active system log size by the storage system log flush rate, to calculate a time $T_s$ to flush all dirty metadata in a memory system having two SP file systems. Divide the individual file system active log size by the storage system log flush rate to calculate a time $T_{fs}$ to flush accumulated dirty metadata in the file system, and subtract $T_{fs}$ from $T_s$ to form the proper sync interval. The sync interval may be calculated at the end of each sync process, since overall system load may change rapidly due to changes in demand on the memory storage system.

The availability of an unused IO channel for flushing dirty metadata memory buffers in the cache memory may be determined by calculating a file system IO latency time, an active file system log size, a number of log hold events, and a total amount of SP cache memory currently used for different buffers types in the file system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the disclosed arrangement will be described. It should be understood that the embodiments are provided as examples to illustrate the principles and use of the inventive concepts, and that the material of the disclosure is broader than the specific examples given, and should only be limited by the attached claims.

Flushing cache memory of dirty metadata in a group of SP file systems operating in parallel to serve the memory storage needs of a group of host systems without either letting the SP caches reach their maximum capacity, or without using so much of the total SP system IO process bandwidth that host system IO process requests are unreasonably delayed, may include determining the length of an interval between sync operations for each individual one of the SP file systems. It may also include determining how to divide a system wide maximum sync process IO operation bandwidth fairly between various ones of the SP file systems. A storage processor, or other computer, may dynamically measures overall system operation rates, and determine an available portion of a current calculated maximum sync operation bandwidth for each SP file system. The computer may also measure SP file system operation rates and determine how long a time period should exist between sync operations in each file system.

Figure 1:
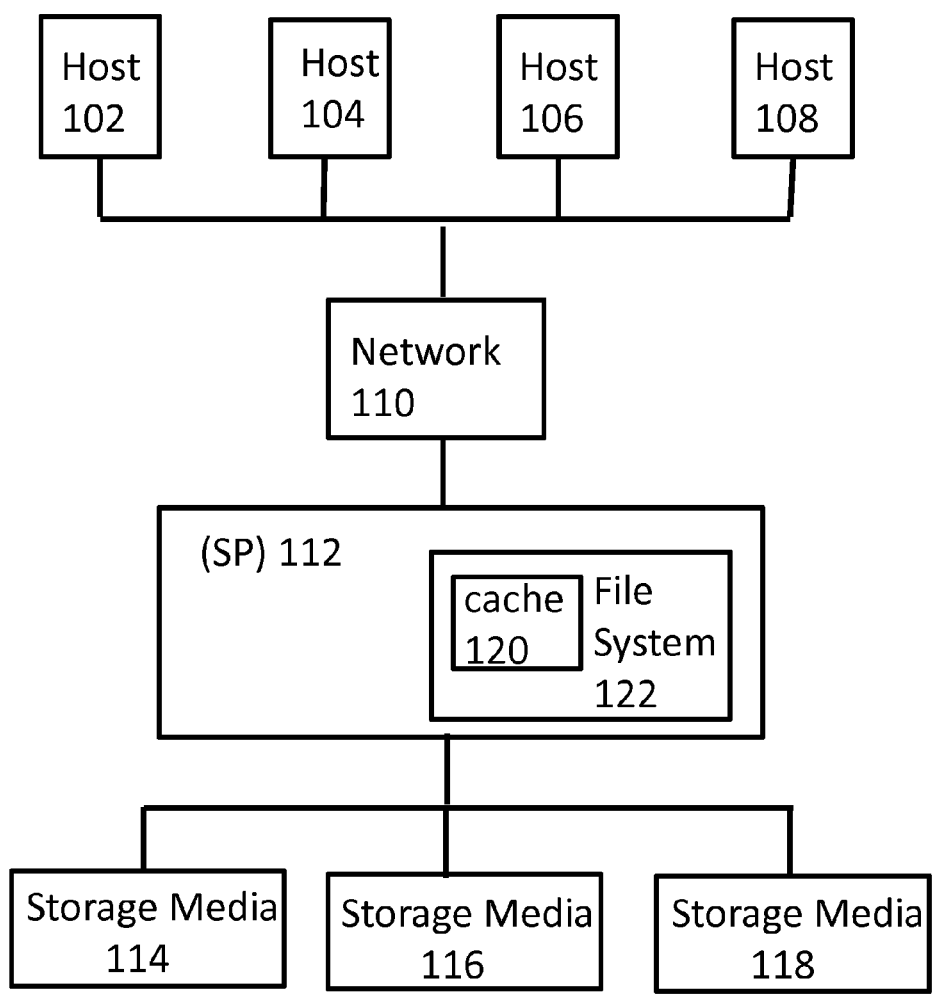
FIG. 1 is a block diagram showing an exemplary storage processor in an environment showing the use of the present arrangement.

FIG. 1 is a block diagram showing an exemplary storage processor in an environment showing the use of the present arrangement. Host systems 102, 104, 106 and 108 are users of the memory storage system, and may be at a remote location and communicate read or write requests by communicating over a network 110, or the host systems may be located local to the storage processor 112, and have direct communication lines. Although four host systems are shown in the figure, the inventive concept is not so limited, and there may be a single host system, or any number of host systems. The host systems may communicate with the storage processor (SP) 112 in any way, including wireless, infrared, hard wire, or internet.

The SP 112 may typically be one of many parallel storage processors, each connected to the host systems, and serving whichever host system has a R/W (read or write) request at a time that the storage processor is not busy. While only one SP 112 is shown in FIG. 1, it is clear that any number of SPs can use the disclosed arrangement separately.

The SP 112 may be connected to a large memory storage device, such as a database, and the host system accesses the memory storage using SP 112. The memory storage may be a single magnetic hard disk drive (HDD), or a cluster of HDD systems such as is found in RAID arrays, or it may be any other arrangement of memory devices, such as the three parallel storage media systems 114, 116 and 118, shown in FIG. 1 as an exemplary embodiment. SP 112 may have many internal subdivisions for various operations, for example a file system 122 for handling memory IO operations from host systems such as host 102. There may be many file systems 122 included in the SP 112, and the file system 122 may typically be a part of a data storage system having many file systems in each one of a large number of SPs, serving a large number of users, or host systems, in accessing portions of a large database, such as storage media 114. The storage media may be a local memory device, or may be distributed widely geographically for security and back up purposes.

The file system 122 handles IO operations for a host system transmitting data to the storage media. Each time the file system 122 handles data there may be changes made in the data, such as translating a file request to a block memory request, and this may cause what is known as metadata to change. To improve file system operations the metadata may be stored in a local memory known as a cache memory, such as cache 120 shown in the figure. Local storage of metadata may reduce the amount of time spent accessing data, and a cache may typically be formed of fast access ICs such as DRAM. The metadata temporarily stored in the cache 120 may be different than the metadata in the storage media, and the SP 112 will periodically update the old data in the storage media with the updated data in the cache 120. This updating is known as flushing dirty (i.e., changed/updated) metadata from the cache 120 to the persistent memory (i.e., storage media 114), and occurs during what is known as a sync operation, which synchronizes the updated SP cache information with the main data in the database.

There may be numerous cache memories in the file system 122, each cache used for a different type of metadata. For example, the cache 120 may be used for storing data that is descriptive of a type of change to the data operated upon by the host 102, which may be known as metadata. Metadata includes information about the main data related to inode tables, block metadata (BMD), slice maps, and directories. Metadata is temporarily stored in the SP 112 in a cache memory such as 120, and thus the metadata cache also needs to be flushed to the main memory periodically, typically during a metadata sync operation. Sync operations may occur every ten to forty seconds, depending on dirty metadata generation rates.

An illustrative method flushes the metadata cache 120 by performing a sync process periodically to transfer dirty metadata in memory buffers in cache 120 to a persistent memory location such as storage media 114 using IO operations. Metadata IO operations may occur concurrently with the normal host system user IO operations, and a balance between the numbers of IO operations used to flush dirty metadata versus the numbers of host system IO operations is beneficial, since the total number of possible concurrent IO operations (i.e., back end bandwidth) in any memory storage system is limited, typically to about 512 concurrent IOs.

Figure 2:
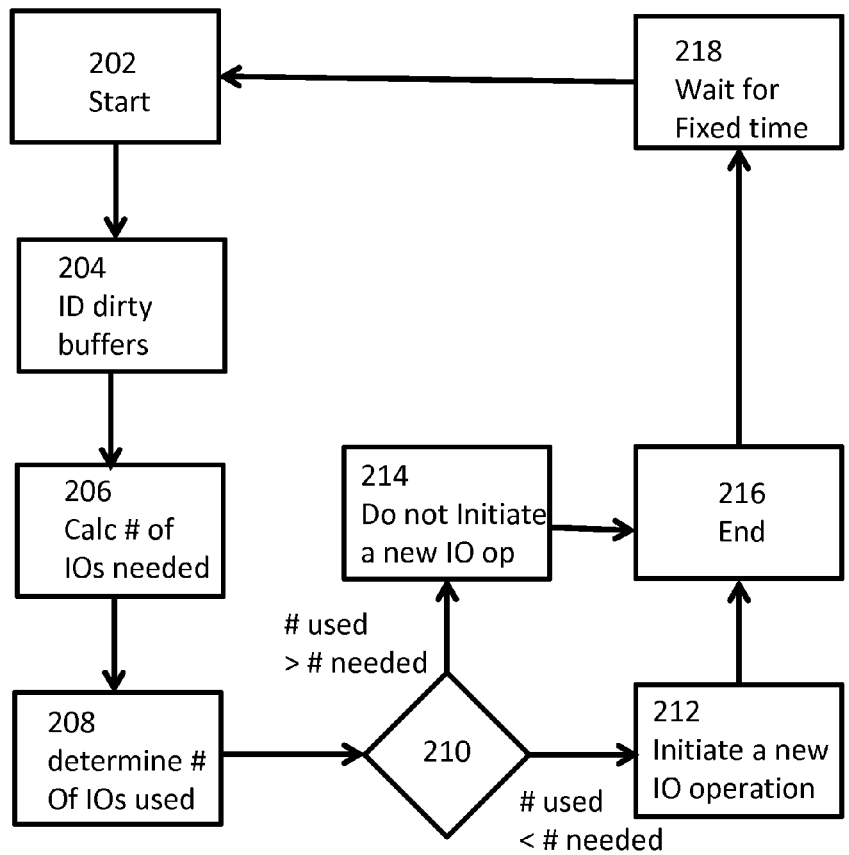
FIG. 2 is a flowchart showing a method using the present arrangement.

FIG. 2 is a flowchart showing a method using the present arrangement. The method flushes dirty metadata memory buffers in a SP file system 122 by performing a sync process periodically to transfer dirty metadata memory buffers in a cache memory to a persistent memory, a process known as flushing. FIG. 2 shows a part of a single sync process, in a single SP that may be one of many parallel operating SP units, where each SP may have many file systems. The method determines how many concurrent metadata sync IO operations a SP file system can use at a given point in time.

The method starts at step 202 and includes identifying dirty metadata memory buffers in the SP cache memory at step 204. The method may include calculating at step 206 the number of concurrent IO operations needed for flushing dirty metadata memory buffers in the cache memory to the storage system persistent memory, which may also be known as a main memory, non-volatile memory, or a database, and may include such non-volatile devices as a magnetic hard disk drive (HDD), an electronic flash drive (EFD), or a solid state disk (SSD).

The number of concurrent IO operations needed for flushing at any particular time may be obtained at step 206 by dividing the current number of dirty metadata memory buffers in the file system by a flush rate, and then dividing the result by the time to reach a predetermined high water mark of a number of dirty metadata memory buffers in the file systems 122 cache memory 120. The time to reach the high water mark may be called $T_{hw}$. Once the needed number of IO operations is determined the method determines at step 208 how many concurrent IO operations are currently being used for sync operations. The method can then determine at step 210 to either initiate a new IO operation to transfer a dirty metadata to the persistent memory location if the number of sync IO operations being used currently is less than the needed number at step 212, or refraining from initiating the new IO operation if the number is greater than the needed number of number of concurrent IO operations at step 214. Either way, the method then ends at step 216, where it begins again at step 202 after a predetermined time period at step 218. The entire process may be repeated at any time, including during a sync process.

The method may further include directly measuring the number of dirty metadata memory buffers in the cache memory 120 of the SP file system 122, and may determine the flush rate of dirty metadata memory buffers in the file system 122 by determining a current active log size for the file system 122, determining a current storage system log size, and then dividing the current active log size by the current system log size, and multiplying the result by a global storage system flush rate. The global storage system flush rate is a maximum number of IO operations that may be used concurrently at a particular time for the combination of all the files systems 122 in all the storage processors SP 112 in the overall memory system handling storage IO requests from the host systems (such as 102, 104, 106 and 108) for access to the storage media (such as 114, 116 and 118). The global storage system flush rate may be obtained by increasing the number of concurrent IO processes allowed to be used for sync operations slowly until a measured IO latency time starts to increase above a selected maximum value.

The value $T_{hw}$ noted above in the description of the embodiment, is a value that varies depending upon the system operating rate, and may vary depending upon what sort of metadata is stored in each metadata cache. An exemplary method for determining the value $T_{hw}$ may use the example of a log hold cache, and can be calculated by determining the current number of log holds used in the SP file system 122, and then determining the current log hold accumulation rate in the SP file system, which is related to the total numbers of host system IO operations and system history. The maximum allowable number of dirty metadata buffers in a cache memory in the SP file system may be called the high water mark, and subtracting the number of log holds used from the high water mark, and then dividing by the current log hold accumulation rate can provide the time to reach the high water mark of that cache memory 120, the value $T_{hw}$. In the case where the file system is just one of many file systems in a storage system, then the value of $T_{hw}$ can be found by calculating the time to reach the high water mark in each one of the SP file systems, and then setting the value of $T_{hw}$ for the overall storage system to be the minimum value of all of the individual file system 122 times.

Figure 3:
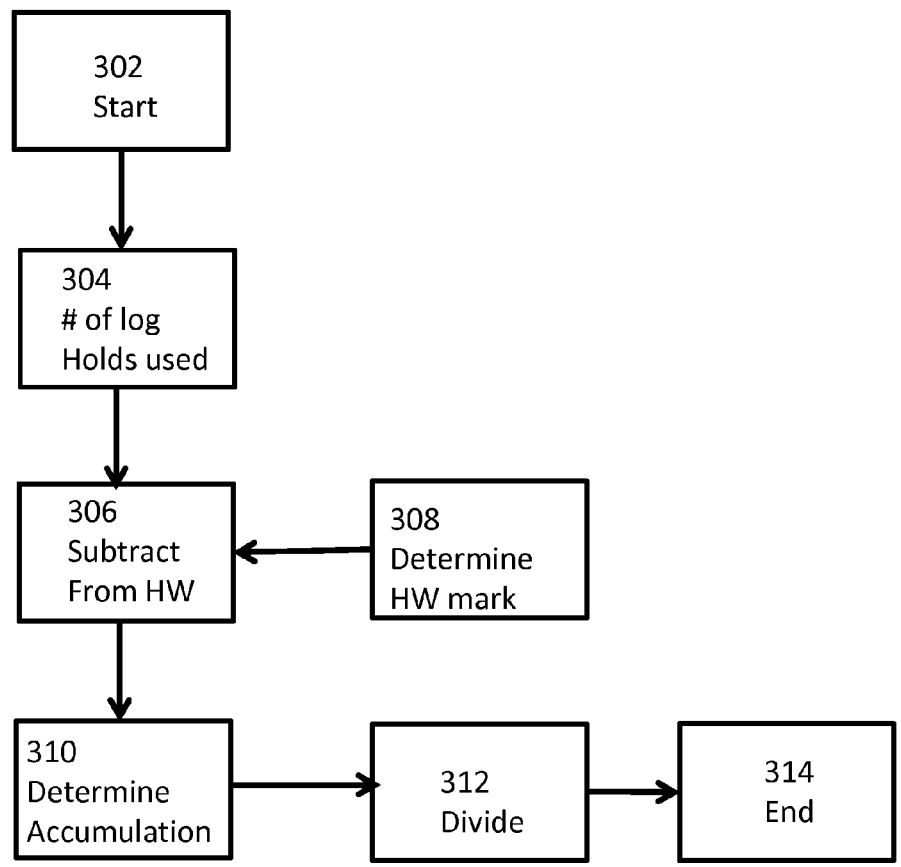
FIG. 3 is a flow chart showing another method for the present arrangement.

FIG. 3 is a flow chart showing another method for the present arrangement. In this illustrative example embodiment there may be more than a single cache memory 120 in each file system 122, with each cache 120 storing different types of metadata. The method for determining the minimum time needed to reach the high water mark in each cache 120, which may be called $T_{min}$, may include starting at step 302, and then determining a time until each of the caches must be flushed. Each different cache type can determine the time until their own high water mark is reached in that particular cache by using appropriate variations of these following illustrative basic calculations. For example, calculating a block metadata (BMD) time until flush, $T_{BMD}$, may be found by subtracting, at step 306, a measured number of log holds used, determined at step 304, from a predetermined BMD high water mark, calculated at step 308. Then dividing, at step 312, the result found at step 306, by a measured accumulation rate for BMD in that cache, measured at step 310. The predetermined BMD high water mark may be determined at step 308 by the size of the cache memory used for storing BMD metadata. The method then ends at step 314.

Calculating a log size time, $T_{log\text{-}size}$, may be obtained in a similar fashion to that illustrated in FIG. 3, by subtracting a measured active log size from a predetermined log size high water mark, and dividing the result by a measured accumulation rate of active log entries.

Similarly, calculating a log hold time, $T_{log\text{-}hold}$, may be done by subtracting a measured number of log holds used from a predetermined log hold high water mark, and dividing by a measured log hold accumulation rate. Calculating an inode buffer time, $Ti_b$, may include subtracting a measured number of inode buffers used from a predetermined inode high water mark, and dividing the result by a measured inode buffer accumulation rate, and so on. Using the minimum value of the calculated values $T_{BDM}$, $T_{log\text{-}hold}$, and $Ti_b$, provides the value of $T_{min}$ for the SP file system.

Determining whether there is an unused IO channel that can be used for flushing dirty metadata memory buffers in the cache memory may include calculating at least one of a file system IO latency time, a size of an active file system log size, an amount of cache memory assigned to log hold events, and a total amount of cache memory currently used for different buffers types in the file system.

Figure 4:
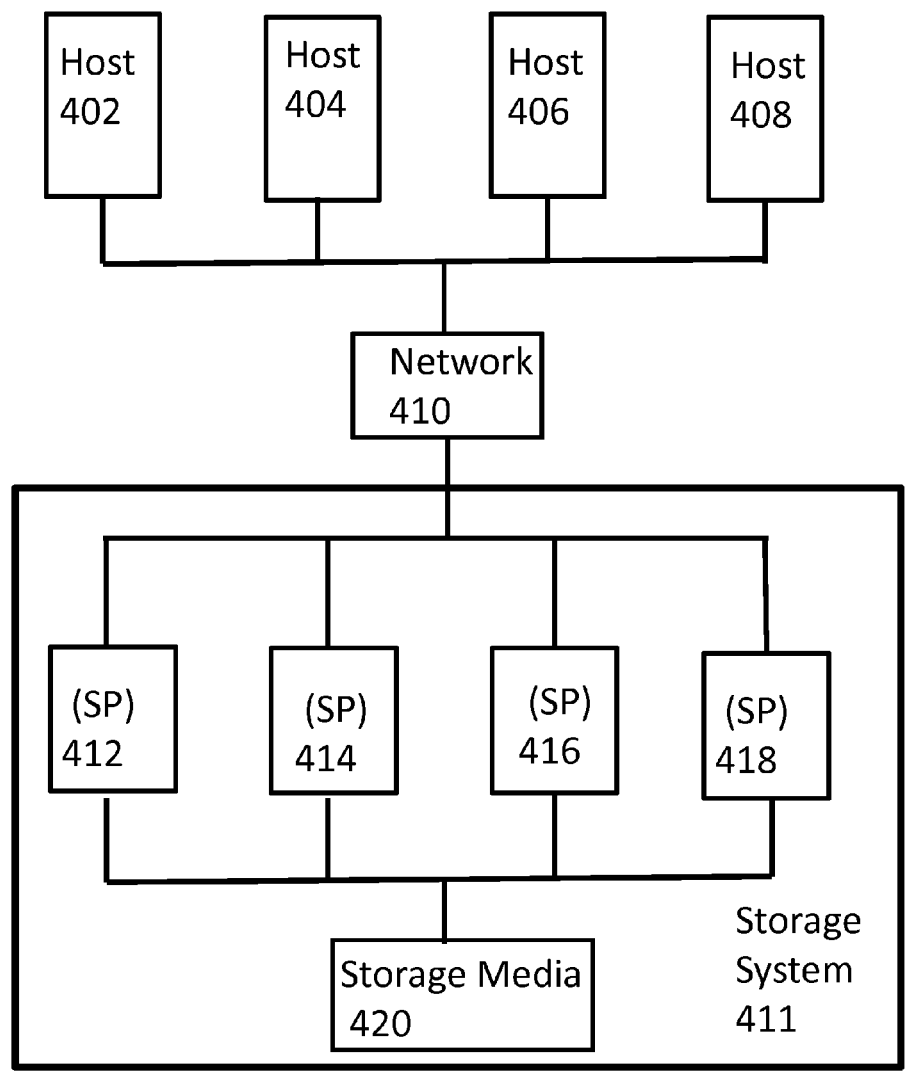
FIG. 4 shows a system for flushing dirty metadata in a storage system.

FIG. 4 shows a system for flushing dirty metadata in a storage system. The storage system 411 may have any number of host systems 402, 404, 406, 408, connected to a network 410 or directly to the storage system 411. Storage system 411 may include any number of storage processors (SP) 412, 414, 416, 418, and each SP may include a plurality of file systems (122 of FIG. 1) and storage media 420. In this case the minimum time $T_{hw}$ to reach a high water mark in any cache (120 of FIG. 1) in the storage system 411 may be determined by calculating a value of a time $T_{min}$ to reach a predetermined high water mark in each individual one of caches in the file systems, and then set the value of $T_{hw}$ for the storage system 411 to be the minimum value of all of the individual file system minimum times. This may be done as disclosed previously above by determining a time until each cache in each file system must be flushed and using the shortest (i.e., the minimum) time. Examples of the different types of caches that may be found in file systems include caches for block metadata (BMD) time, $T_{BMD}$, active log size, $T_{log\text{-}size}$, log hold time, $T_{log\text{-}hold}$, and inode buffer time, $Ti_b$.

Figure 5:
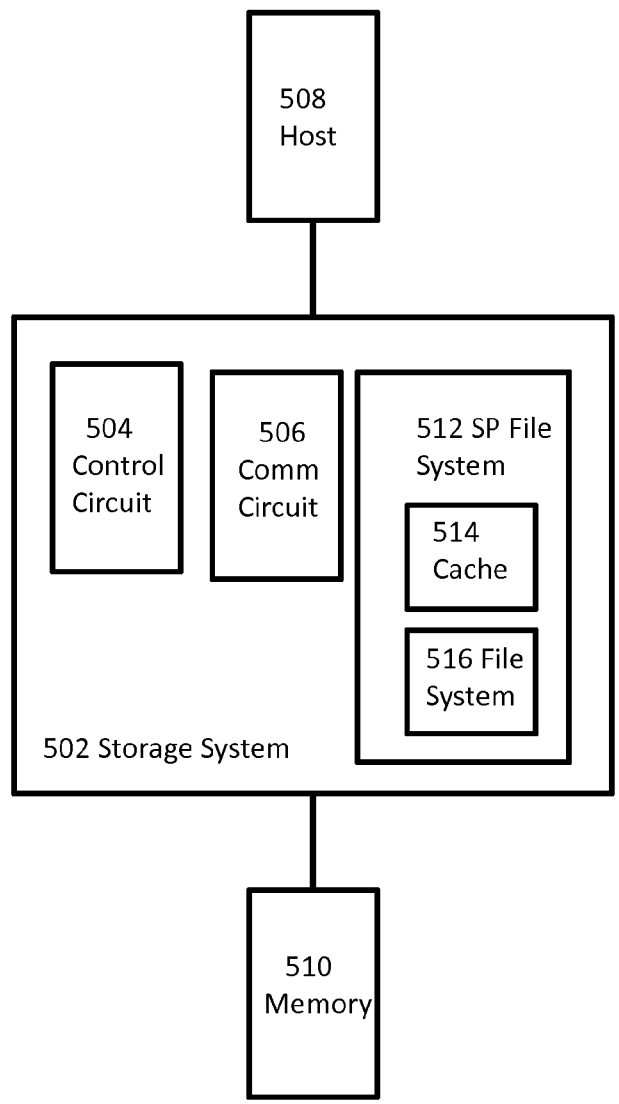
FIG. 5 is a block diagram of a system used in the present arrangement.

FIG. 5 is a block diagram of a system used in the present arrangement. Flushing dirty metadata memory buffers in a storage system 502 may include a controller circuit 504, which may be a storage processor (such as SP 112 of FIG. 1) or any sort of computing system. The system may also include a communications circuit 506 for connecting 10 requests from a host system 508 for access to a storage memory 510 (such as the storage media 114 of FIG. 1). The controller 504 and the communication circuit 506 are disposed between the host 508 and the memory 510 to enable electrical signals to flow between the host system to at least one SP file system 512 of the storage system 502 via the controller 504 and communications circuit 506, and resulting in transferring IO data from the host 508 to the memory 510.

The controller 504 may be constructed and arranged to perform a sync process periodically to transfer dirty metadata memory buffers in a cache memory 514 of the SP file system 512 to memory 510, typically a persistent memory such as a magnetic hard disk drive (HDD) or electronic Flash Drive (EFD), by using IO channel operations. The controller 504 can identify dirty metadata memory buffers in the cache memory 514, which may have been generated in a file system 516 of the SP 512 in the course of transmitting IO data from the host 508 to the memory 510. The controller 504 can calculate a required number of concurrent IO operations needed to flush dirty metadata memory buffers in cache 514 to the memory 510 using the methods described above. The number of concurrent IO operations needed can be calculated by the controller 504, by dividing a current number of dirty metadata memory buffers in the cache 514 in file system 512, by a flush rate, and then dividing the result by $T_{hw}$, which is a time to reach a predetermined high water mark of a number of dirty metadata memory buffers in the file system 512, which may have more than a single cache 514, in the illustrated case there may also be a second cache, which may hold different types of metadata than cache 514. The system 502 may initiate a new IO operation to transfer a dirty metadata buffer in cache 514 to the memory 510 location if the number of current IO operations being used for flushing dirty metadata memory buffers is less than the required number of concurrent IO operations as calculated above.

If the number of current IO operations being used at a given time for flushing dirty metadata memory buffers is equal to or greater than the required number of concurrent IO operations, then the controller can refrain from initiating a new IO operation to delay transfer of the dirty metadata to the persistent memory location until there are available IO operations.

Identifying dirty metadata memory buffers in the cache memory may be done in various ways, and may be a direct measurement of the number of dirty metadata memory buffers in the cache memory of the file system, or it may be a calculated or estimated value. The flush rate of dirty metadata memory buffers in the SP file system can be determined by dividing the current active log size by the current system log size, and multiplying the result by a global storage system flush rate.

The time $T_{hw}$ can be determined by the controller using the method disclosed above by subtracting the number of log holds used from the high water mark, and then dividing by the current log hold accumulation rate to obtain the value $T_{hw}$.

In addition to improving dirty metadata flushing from cache memory to a main memory 510, or database, by calculating the proper number of IO processes to use concurrently during flushing in each of the SP file systems, the disclosed system may also calculate a proper sync interval time between the end of a sync process and a start of a new sync process for each SP file system. Each SP file system may have different sync intervals for similar reasons as why they may have different numbers of concurrent IO operations used for flushing dirty metadata, namely each SP file system has a different usage rate.

Figure 6:
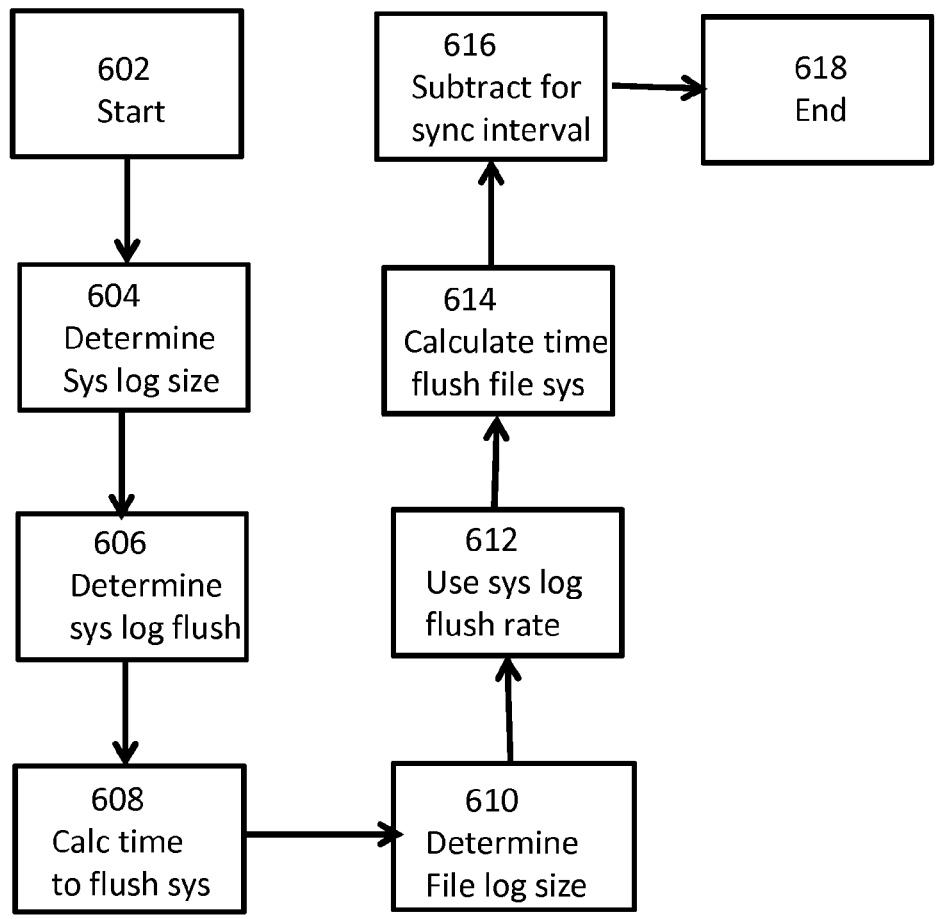
FIG. 6 is a flowchart showing the method for determining a sync interval.

FIG. 6 is a flowchart showing the method for determining a sync interval. The sync interval may be calculated for each individual file system, since each file system has different usage rates at different times and thus different rates at which the cache buffers are filled with dirty metadata. The sync interval should also be adjusted based upon the storage processor overall system status in addition to the status for an individual file system.

The sync interval may be calculated starting at step 602, by dividing a system wide active system log size, determined at step 604, by a storage system log flush rate, determined at step 606, to calculate, at step 608, a time $T_s$ to flush all dirty metadata in a memory system having two or more file systems, such as file systems included in SP 412 of FIG. 4. Divide the individual file system active log size, determined at step 610, by the storage system log flush rate, determined at step 612, to calculate, at step 614, a time $T_{fs}$ to flush accumulated dirty metadata in the file system. Then subtract, at step 616, $T_{fs}$ from $T_s$ to calculate the proper current sync interval. The system calculation ends at step 618. The sync interval may be calculated at the end of each sync process, since the overall memory system load may change rapidly due to changes in the number of host systems requiring IO operations at any given time. The sync interval may also be calculated at any time there appears to be a change in system operation, such as one of the various SP caches reaching a full status.

A method for flushing dirty metadata memory buffers in individual file systems that may be part of a memory storage system may include periodically performing a sync process to transfer dirty metadata buffers in a cache memory to a persistent memory location, is also basically illustrated in FIG. 6. To reduce host system IO process latency times, the sync process may not be continuous, and each sync operation may be separated by a sync interval in which the sync process is not performed. The length of the sync interval may be increased during times with low host system IO process demand, and may be calculated continuously.

Upon completion of a first sync process for one of the file systems, a duration time for the initiation of a next sync process may be calculated by the steps of calculating a time $T_s$ to flush all dirty metadata memory buffers of all the file systems. The memory storage system 411 flush time, may be found at 608, by dividing a system-wide active system log size, 604, by a storage system log flush rate, 606. Then the method may calculate, at 614, a time $T_{fs}$ to flush accumulated dirty metadata of the one file system, for example one file system of the SP 512, by dividing a file system active log size, 610, by the storage system log flush rate, at step 612. The storage system log flush rate was previously calculated at step 604. Subtracting, at 616, $T_{fs}$ from $T_s$ then results in a calculated duration of the next sync interval, and the method ends at 618.

The calculated sync interval may result in a value that is too high or too low if there are issues with the number of host system IO operation requests during a period of extremely high usage, or due to software problems, power failures, or during restarts and boot operations. In this situation the sync interval may be set to a predetermined value $T_{min}$ if the calculated duration of the sync interval is less than $T_{min}$, and set to $T_{max}$ if the calculated duration of the next sync interval is greater than $T_{max}$. Typically, $T_{min}$ may be a value of about 10 seconds, and $T_{max}$ a value of about 40 seconds.

Since the sync interval may be calculated for each individual one of the file systems in a storage system individually, then it is possible that many or all of the file systems may start a sync operation simultaneously, which may cause data congestion. Reducing the number of file systems flushing dirty metadata simultaneously may be accomplished using the method by adding randomly generated time periods to randomly selected file system sync intervals, thus decreasing the chance of simultaneous sync operations. When the memory system is only writing to a single file system, due for example, to low host system usage, rather than to a large number of file systems, then the sync interval may be set to $T_{min}$, and the sync interval may be set to zero, that is continuous sync operations, if at the end of performing a sync process the number of dirty metadata memory buffers is above a predetermined soft water mark.

Further improvement may be obtained, by identifying dirty metadata memory buffers in the cache memory and calculating the number of concurrent IO operations needed for flushing dirty metadata memory buffers in a cache memory to a persistent memory. This adds controlling the bandwidth of dirty metadata flushing to setting the percentage of time that flushing dirty metadata occurs, or what may be known as the duty cycle. This may be done in similar fashion to the disclosure above by dividing the number of dirty metadata memory buffers in the file system by a flush rate, and dividing the result by $T_{hw}$, the time to reach a predetermined high water mark of a number of dirty metadata memory buffers in the file system.

A system to flush dirty metadata memory buffers in individual SP file systems in a storage system, as shown in FIG. 4, may include controller circuitry 504 along with communication circuitry 506 enabled to receive data from a host system 508, and transfer the data to the storage media via the SP 512 file system 516. The processor may perform a sync process periodically to transfer dirty metadata buffers in SP 512 cache 514 to a persistent memory 510 location, such as a magnetic hard disk drive, with the sync processes separated by sync intervals with no sync processing. To calculate a sync interval between an end of one sync process and another, as shown in FIG. 6, the controller 504 can divide a system wide active system log size by a storage system log flush rate, to calculate a time $T_s$ to flush all dirty metadata, and divide the individual file system active log size by the storage system log flush rate of the entire storage system to calculate a time $T_{fs}$ to flush accumulated dirty metadata in a SP file system, and then subtract $T_{fs}$ subtract $T_{fs}$ from $T_s$ to form the sync interval. If the calculation is outside of normal levels, the sync interval may be set to a value $T_{min}$, such as about 10 seconds when the sync interval is too low, or the sync interval may be set to a value to $T_{max}$, such as about 40 seconds, when the calculated sync interval is too high.

It should be noted that the system 502 may be generating dirty metadata even while a sync operation is flushing dirty metadata, i.e., the system may be concurrently generating dirty metadata in the caches as the previously identified dirty metadata is being flushed from the cache to the storage media. In the absence of generating dirty metadata concurrently with a sync process, at the end of the sync process all of the dirty metadata will have been flushed to the storage media, if the sync bandwidth was allowed to be large enough to complete the flush during allowed time. The bandwidth allowed for metadata sync operations may depend upon how large a percentage of the backend bandwidth can be used for metadata sync operations without causing Host system IO requests to back up and take too long to complete, a situation known as data congestion. Thus, a combination of operational factors, including the above noted low metadata bandwidth, and the generation of dirty metadata during the sync operation, it may happen that at the end of a sync operation the number of dirty metadata locations in the cache may be greater than zero, and may be greater than what may be known as a soft water mark. If the soft water mark is reached at the end of a sync process, the disclosed method and apparatus may set the sync interval to zero, and immediately begin a new sync operation to attempt to flush the dirty metadata.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for flushing dirty metadata memory buffers in a file system, comprising:
performing a sync process periodically to transfer dirty metadata memory buffers in a cache memory to a persistent memory using IO operations by:
identifying dirty metadata memory buffers in the cache memory;
calculating an accumulation value indicative of whether there is a need to increase a number of concurrent IO operations for flushing dirty metadata memory buffers in a cache memory to a persistent memory by:
dividing a current number of dirty metadata memory buffers in the file system by a flush rate; and
dividing the result by $T_{hw}$, to provide the accumulation value, where $T_{hw}$ is a time to reach a predetermined high water mark of a number of dirty metadata memory buffers in the file system;
initiating a new IO operation to transfer a dirty metadata memory buffer to the persistent memory location if the accumulation value indicates there is a need for an increase in a number of current IO operations being used for flushing dirty metadata memory buffers; and
refraining from initiating the new IO operation to thereby delay transferring the dirty metadata to the persistent memory location if the accumulation value indicates there is no need for an increase in the number of current IO operations being used for flushing dirty metadata memory buffers.

2. The method of claim 1, wherein the identifying dirty metadata memory buffers in the cache memory further includes directly measuring the number of dirty metadata memory buffers in the cache memory of the file system.

3. The method of claim 1, further including determining the flush rate of dirty metadata memory buffers in the file system by:
determining a current active log size for the file system;
determining a current storage system log size; and
calculating the flush rate by dividing the current active log size by the current system log size, and multiplying the result by a global storage system flush rate.

4. The method of claim 1, wherein calculating $T_{hw}$ includes:
determining a current number of log holds used in the file system;
determining a current log hold accumulation rate in the file system;
selecting the predetermined high water mark to equal a maximum allowable number of dirty metadata buffers in a cache memory in the file system, and
subtracting the current number of log holds used from the high water mark, and dividing by the current log hold accumulation rate to obtain the value $T_{hw}$.

5. The method of claim 1, wherein the file system is one of a plurality of file systems in a storage system, wherein $T_{hw}$ is determined by;
calculating, in each individual one of the plurality of file systems, a value of a time $T_{min}$ to reach a predetermined high water mark in that individual one of the plurality of file systems; and
setting the value of $T_{hw}$ for the storage system to be the minimum value of all of the individual file system minimum times $T_{min}$.

6. The method of claim 5, wherein determining $T_{min}$ for each individual one of the plurality of file systems further comprises:
 storing by a plurality of caches in each one of the plurality of file systems, each cache storing a current value for a different system parameter, each parameter having a maximum allowable value;
 determining a time until each cache must be flushed, including at least one of:
  calculating a block metadata (BMD) time, $T_{BMD}$, by subtracting a measured number of log holds used from a predetermined BMD high water mark, and dividing the result by a measured accumulation rate for BDM;
  calculating a log size time, $T_{log-size}$, by subtracting a measured active log size from a predetermined log size high water mark, and dividing the result by a measured accumulation rate of active log entries;
  calculating a log hold time, $T_{log-hold}$, by subtracting a measured number of log holds used from a predetermined log hold high water mark, and dividing by a measured log hold accumulation rate;
  calculating an inode buffer time, $Ti_b$, by subtracting a measured number of inode buffers used from a predetermined inode high water mark, and dividing by a measured inode buffer accumulation rate;
 setting $T_{min}$ for each individual one of the plurality of file systems to be equal to the minimum of $T_{BDM}$, $T_{log-size}$, $T_{log-hold}$, and $Ti_b$.

7. The method of claim 1, wherein determining availability of an unused IO channel for flushing dirty metadata memory buffers in the cache memory further includes calculating at least one of a file system IO latency time, a size of an active file system log size, an amount of cache memory assigned to log hold events, and a total amount of cache memory currently used for different buffers types in the file system.

8. A system to flush dirty metadata memory buffers in a storage system comprising controller circuitry including communication circuitry enabling electrical signals to flow between at least one host system to at least one file system of the storage system via the controller circuitry, the controller circuitry constructed and arranged to:
 perform a sync process periodically to transfer dirty metadata memory buffers in a cache memory of the file system to a persistent memory using IO channel operations;
 identify dirty metadata memory buffers in the cache memory;
 calculate an accumulation value indicative of whether there is a need to increase a number of concurrent IO operations to flush dirty metadata memory buffers in a cache memory to a persistent memory, including:
  divide a current number of dirty metadata memory buffers in the file system by a flush rate; and
  divide the result by $T_{hw}$, to provide the accumulation value, where $T_{hw}$ is a time to reach a predetermined high water mark of a number of dirty metadata memory buffers in the file system; and
 initiate a new IO operation to transfer a dirty metadata buffer to the persistent memory location if the accumulation value indicates there is a need for an increase in a number of current IO operations being used for flushing dirty metadata memory buffers; and
 refrain from initiating a new IO operation to thereby delay transfer of the dirty metadata to the persistent memory location if the accumulation value indicates there is no need for an increase in the number of current IO operations being used for flushing dirty metadata memory buffers.

9. The system of claim 8, wherein the controller circuitry to identify dirty metadata memory buffers in the cache memory further includes a direct measurement of the number of dirty metadata memory buffers in the cache memory of the file system.

10. The system of claim 8, wherein the flush rate of dirty metadata memory buffers in the file system is determined by:
 a current active log size measurement for the file system;
 a current storage system log size measurement; and
 divide the current active log size by the current system log size, and multiply the result by a global storage system flush rate.

11. The system of claim 8, wherein the time $T_{hw}$ is determined by:
 a current number of log holds used in the file system measurement;
 a current log hold accumulation rate in the file system measurement;
 the predetermined high water mark selected to equal a maximum allowable number of dirty metadata buffers in a cache memory in the file system, and
 subtract the number of log holds used from the high water mark, and divide by the current log hold accumulation rate to obtain the value $T_{hw}$.

12. The system of claim 8, wherein the file system is one of a plurality of files systems in a storage system, wherein $T_{hw}$ is determined by;
 in each individual one of the plurality of file systems, calculate a value of a time $T_{min}$ to reach a predetermined high water mark in that individual one of the plurality of file systems; and
 set the value of $T_{hw}$ for the storage system to be the minimum value of all of the individual file system minimum times $T_{min}$.

13. The system of claim 12, wherein $T_{min}$ is determined for each individual one of the plurality of file systems further comprises:
 store in each of a plurality of caches in each one of the plurality of file systems, a current value for one of a plurality of different system parameters, each parameter having a maximum allowable value;
 determine a time until each cache must be flushed, including at least one of:
  subtract a measured number of log holds used from a predetermined BMD high water mark, and divide the result by a measured accumulation rate for BDM to calculate a block metadata (BMD) time, $T_{BMD}$;
  subtract a measured active log size from a predetermined log size high water mark, and divide the result by a measured accumulation rate of active log entries to calculate a log size time, $T_{log-size}$;
  subtract a measured number of log holds used from a predetermined log hold high water mark, and divide by a measured log hold accumulation rate to calculate a log hold time, $T_{log-hold}$;
  subtract a measured number of inode buffers used from a predetermined inode high water mark, and divide by a measured inode buffer accumulation rate to calculate an inode buffer time, $Ti_b$; and
 set $T_{min}$ for each individual one of the plurality of file systems to be equal to the minimum of $T_{BDM}$, $T_{log-size}$, $T_{log-hold}$, and $Ti_b$.

14. The system of claim 13, further including the system configured to:

calculate a sync interval between an end of the sync process and a start of a next sync process for the individual one of the plurality of file systems in a storage system, by having the controller:
  divide a system wide active system log size by a storage system log flush rate, to calculate a time $T_s$ to flush all dirty metadata in a memory system comprising at least two file systems;
  divide the individual one of the plurality of file systems active log size by the storage system log flush rate to calculate a time $T_{fs}$ to flush accumulated dirty metadata in a file system;
  subtract $T_{fs}$ from $T_s$ to form the sync interval; and
initiate the next sync process at the end of the calculated duration.

15. The system of claim 8, wherein availability of an unused IO channel for flushing dirty metadata memory buffers in the cache memory is determined by calculating at least one of a file system IO latency time, a size of an active file system log size, an amount of cache memory assigned to log hold events, and a total amount of cache memory currently used for different buffers types in the file system.

16. A method for flushing dirty metadata memory buffers in individual ones of a plurality of file systems in a storage system, comprising:
performing a sync process periodically to transfer dirty metadata buffers in a cache memory to a persistent memory location, successive performances of the sync process being separated by respective sync intervals in which the sync process is not being performed; and
upon completion of a first performance of the sync process for one of the file systems, calculating a duration of a next sync interval to pass before a second performance of the sync process for the one file system by the steps of:
  calculating a time $T_s$ to flush all dirty metadata memory buffers of all the file systems by dividing a system-wide active system log size by a storage system log flush rate;
  calculating a time $T_{fs}$ to flush accumulated dirty metadata of the one file system by dividing a file system active log size by the storage system log flush rate; and
  subtracting $T_{fs}$ from $T_s$ to obtain a calculated duration of the next sync interval; and
waiting for the calculated duration before initiating the second performance of the sync process.

17. The method of claim 16, further including:
setting the sync interval to a predetermined value $T_{min}$ when determining that the calculated duration of the sync interval is less than a value $T_{min}$; and
setting the sync interval to a predetermined value $T_{max}$ when determining that the calculated duration of the next sync interval is greater than a value $T_{max}$.

18. The method of claim 17, further including setting $T_{min}$ to a value of 10 seconds, and setting $T_{max}$ to a value of about 40 seconds.

19. The method of claim 16, further including each individual one of the plurality of file systems in the storage system individually calculating a sync interval for that individual file system.

20. The method of claim 16, further including reducing the number of file systems flushing dirty metadata simultaneously by adding a plurality of randomly generated time periods to randomly selected file system sync intervals.

21. The method of claim 16, wherein further the sync interval is set to $T_{min}$ when the memory system is only writing to a single file system.

22. The method of claim 16, wherein the sync interval is set to zero if at the end of performing a sync process the number of dirty metadata memory buffers is above a predetermined soft water mark.

23. The method of claim 16, further including identifying dirty metadata memory buffers in the cache memory;
  calculating an accumulation value indicative of whether there is a need to increase a number of concurrent IO operations needed for flushing dirty metadata memory buffers in a cache memory to a persistent memory by:
    dividing a current number of dirty metadata memory buffers in the file system by a flush rate; and
    dividing the result by $T_{hw}$, to provide the accumulation value, where $T_{hw}$ is a time to reach a predetermined high water mark of a number of dirty metadata memory buffers in the file system; and
  initiating a new IO operation to transfer a dirty metadata memory buffer to the persistent memory location if the accumulation value indicates there is a need for an increase in a number of current IO operations being used for flushing dirty metadata memory buffers; and
  refraining from initiating the new IO operation to thereby delay transferring the dirty metadata to the persistent memory location if the accumulation value indicates there is no need for an increase in the number of current IO operations being used for flushing dirty metadata memory buffers.

24. A system to flush dirty metadata memory buffers in individual ones of a plurality of file systems in a storage system, including controller circuitry including communications circuitry enabling electrical signals to flow between at least one host system to at least one file system of the storage system, the controller circuitry constructed and arranged to:
perform a sync process periodically to transfer dirty metadata buffers in a file system cache memory to a persistent memory location, successive sync processes being separated by respective sync intervals in which the sync process is not being performed; and
calculate a sync interval between an end of the sync process and a start of a next sync process for the individual one of the plurality of file systems in a storage system, by having the controller:
  divide a system wide active system log size by a storage system log flush rate, to calculate a time $T_s$ to flush all dirty metadata in a memory system comprising at least two file systems;
  divide the individual one of the plurality of file systems active log size by the storage system log flush rate to calculate a time $T_{fs}$ to flush accumulated dirty metadata in a file system;
  subtract $T_{fs}$ from $T_s$ to form the sync interval; and
initiate the next sync process at the end of the calculated duration.

25. The system of claim 24, wherein the sync interval is set to a predetermined value $T_{min}$ when the sync interval is determined to be less than $T_{min}$; and
  the sync interval is set to a predetermined value $T_{max}$ when the sync interval is determined to be greater than $T_{max}$.

26. The system of claim 25, wherein further $T_{min}$ is set to a value of 10 seconds, and setting $T_{max}$ to a value of about 40 seconds.

27. The system of claim 24, wherein further each individual one of the plurality of file systems in the storage system individually calculates a sync interval for that individual file system.

28. The system of claim 24, wherein further the number of file systems flushing dirty metadata simultaneously is reduced by a plurality of randomly generated time periods added to randomly selected file system sync intervals.

29. The system of claim 24, wherein further the sync interval is set to $T_{min}$ when the memory system is only writing to a single file system.

30. The system of claim 24, wherein the sync interval is set to zero if at the end of performing a sync process the number of dirty metadata memory buffers is above a predetermined soft water mark.

\* \* \* \* \*